April 25, 1939.   B. E. WILLIAMS ET AL   2,155,746
MARKING CARCASSES
Filed Aug. 2, 1937
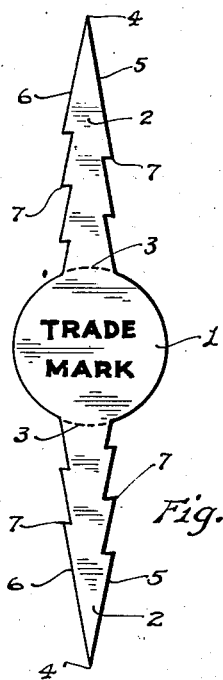
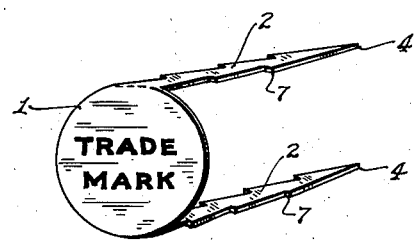
Fig. 2
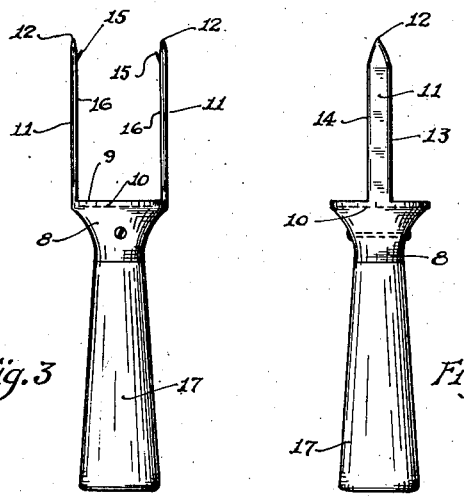
Fig. 3    Fig. 4
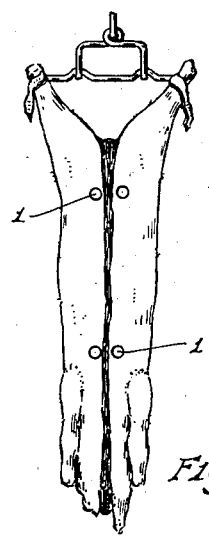
Fig. 6
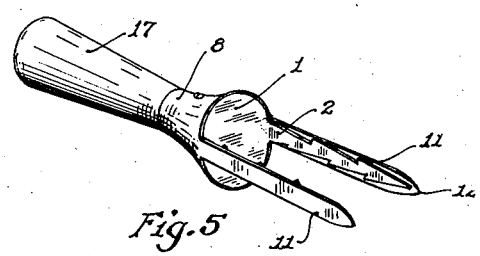
Fig. 5
ATTEST-
Herbert E. Birch
Wm. C. Meiser
Beverly E. Williams
and Andrew S. Hartanov
INVENTOR
BY
ATTORNEY Patented Apr. 25, 1939

2,155,746

UNITED STATES PATENT OFFICE 2,155,746

MARKING CARCASSES

Beverly E. Williams and Andrew S. Hartanov, Chicago, Ill., assignors to Industrial Patents Corporation, Chicago, Ill., a corporation of Delaware Application August 2, 1937, Serial No. 157,051

7 Claims. (Cl. 40—3)

This invention relates to an improved branding tag.

One of the objects of the invention is to provide an improved branding tag.

Another object of the invention is to provide an improved means for branding meat carcasses and cuts thereof.

Another object of the invention is to provide an improved branding tag and means for applying the same.

Other objects of the invention will be apparent from the description and claims which follow.

By way of illustration, but without limitation, the branding tag of the present invention will be described for branding meat carcasses and cuts thereof.

Heretofore, meat carcasses, particularly those with the hide on, have been branded by tying to the hind leg a tag bearing the brand or mark of the producer, grade classification, or other suitable indicia. Tags secured in this manner are often lost through handling, such as, in transit and the like. Furthermore, this practice is considered not satisfactory since there is nothing to prevent an unscrupulous dealer from transferring a tag from a carcass of one producer or grade classification to a carcass of another producer or to a carcass of inferior quality.

The present invention is directed to a more positive means of branding meat carcasses whether with the hide on or off, and also it is applicable to the branding of the individual carcass cuts.

The branding tag of the present invention comprehends a brand plate provided with relatively opposite notched prongs bent substantially at right angles thereto. The brand plate is rigidly secured in a flat condition against the surface of the carcass or meat cut by embedding the notched prongs below the meat surface. The notched prongs of the tag may be pressed into the meat with the aid of an applicator forming a part of the present invention.

In the drawing like characters of reference are used to designate similar elements.

Figure 1 is a plan view of the branding tag of the present invention.

Figure 2 is a perspective view of the branding tag showing the notched prongs bent ready for use.

Figure 3 is a side view illustrating one form of applicator which may be employed for securing the branding tag of the present invention.

Figure 4 is another side view of the tool shown in Figure 3.

Figure 5 is a perspective view illustrating a tag secured within the tool ready for insertion.

Figure 6 is a view of a branded animal carcass.

The branding tag exemplified in Figures 1 and 2 comprises a brand plate 1 of circular or other configuration, upon which may be imprinted the mark or brand of the producer, the grade classification of the product, or other suitable indicia. In the drawing this indicia has been indicated by the use of the words "Trade-mark".

Brand plate 1 is provided with a pair of relatively oppositely disposed prongs 2, separated from plate 1 as by scored lines 3. Prongs 2 are pointed at their free ends as at 4 and at each of their side edges 5 and 6 are provided with a series of notched teeth 7 having pointed ends slanting in the direction of plate 1. It is preferred to stagger or alternate the teeth 7 on opposite sides 5 and 6 of the prongs 2 as shown in the drawing in order to secure greater strength in the prongs 2.

The branding tag may be made of any suitable material. Since, however, the prongs 2 are secured beneath the surface of the product, it is desirable when using the branding tag on products containing moisture and especially edible products, to form the branding tag of a material which over a period of time will not have a harmful effect upon the product, and which will not do harm to the consumer, if perchance, parts of the embedded prongs are left remaining within the product. A branding tag formed of relatively stiff cardboard has been found very satisfactory.

The applicator exemplified in Figures 3 and 4 is adapted for securing the tag in a manner to facilitate its insertion within the product. The applicator comprises a base 8, the surface 9 of which is provided with a depression 10 to accommodate plate 1, and with outwardly projecting prongs 11 relatively oppositely disposed similarly to prongs 2.

Members 11 at their free ends 12 are tapered to a relatively sharp point and at their side edges 13 and 14 and end edges 12 are provided with a continuous knife-like cutting edge.

A relatively short, sharp pin 15 extends inwardly from the inner surface 16 of each of the members 11. The pins 15 are located near, and are slanted toward the ends 12 and serve to rigidly secure the prongs 2 against members 11 during their insertion within the product. The applicator is provided with a suitable handle 17.

Members 11 are preferably of slightly greater length than prongs 2 to provide a lead cut for the admission of prongs 2 while being pressed within the product. Also, members 11 are slightly narrower than prongs 2, so that after insertion within the product teeth 7 will be free to immediately engage the product and thus prevent outward movement of prongs 2 when members 11 are being withdrawn.

In practice, prongs 2 are bent along scored lines 3 at right angles to plate 1. Plate 1 is next fitted within depression 10 and prongs 2 are secured against the members 11 through the medium of pins 15. The applicator with the tag in position is then pressed into and below the surface of the product until plate 1 is moved against the surface of the product. The applicator may then be withdrawn leaving prongs 2 embedded within the product.

The tag may be applied to the carcass immediately after killing and before the flesh has become firm or after the carcass has been chilled. The former method is preferable because when the flesh congeals it securely holds the tag in place and the tag cannot be removed until the plate 1 is first torn from the prongs 2, and then only with the aid of a knife or other instrument. It will be seen that the tag once removed is permanently mutilated, and consequently, not transferable.

As shown in Figure 6, the tag may be applied to the several portions of the meat carcass so that if later the carcass is quartered, each quarter will be separately identified.

The tag of the present invention has been found to provide a means of identification which may be readily seen, one which is resistant to destruction in the normal handling of the carcass, and one which provides an identification for the individual carcass parts.

The term "cardboard" as herein used will be understood to include any flexible material such as strawboard, paperboard, pulpboard, and the like.

We claim:

1. In combination with a branding tag comprising a brand plate having relatively oppositely disposed notched prongs each foldable at a right angle thereto, an applicator comprising a base provided with outwardly extending relatively oppositely disposed members, said base and members having means for securing said brand plate and prongs therebetween.

2. In combination with a cardboard branding tag comprising a brand plate having relatively oppositely disposed notched prongs each foldable at a right angle thereto, an applicator comprising a base having a depression in one surface thereof to accommodate said plate, said surface being provided with outwardly extending relatively oppositely disposed prong supporting members, said members being provided with means for detachably engaging said prongs for insertion of the prongs beneath the branded surface of the branded product.

3. In combination with a cardboard branding tag comprising a brand plate having relatively oppositely disposed notched prongs each foldable at a right angle thereto, an applicator comprising a base having a depression in one surface thereof to accommodate said plate, said surface being provided with outwardly extending relatively oppositely disposed prong supporting members, said members being of a length greater than the length of said prongs and provided with means for detachably engaging said prongs for insertion of the prongs beneath the branded surface of the branded product, each of said members having a continuous relatively sharp cutting edge at each of their end and side edges.

4. A cardboard meat branding tag comprising a brand plate provided with prongs each foldable at a right angle thereto, each of the prongs being provided with notched teeth along each of the side edges thereof, the teeth being slanted toward the branding plate.

5. A cardboard meat branding tag comprising a brand plate provided with prongs each foldable at a right angle thereto, each of the prongs being provided with notched teeth along each of the side edges thereof, the teeth of the opposite side edges of each of the prongs being arranged in staggered relation and slanted toward the plate.

6. In combination with a cardboard branding tag comprising a brand plate having notched prongs each foldable at a right angle thereto, an applicator comprising a base provided with outwardly extending members registerable with the prongs of the brand plate, the base and members having means for securing the brand plate and prongs therebetween.

7. In combination with a cardboard branding tag comprising a brand plate having notched prongs each foldable at a right angle thereto, an applicator comprising a base having a depression in one surface thereof to accommodate the plate, the surface being provided with outwardly extending prong supporting members registrable with the prongs of the brand plate, the members being of a length greater than the length of the prongs and provided with means for detachably engaging the prongs for insertion of the prongs beneath the branded surface of the branded product, each of the members having a continuous relatively sharp cutting edge along each of their end and side edges.

BEVERLY E. WILLIAMS.
ANDREW S. HARTANOV.